US008621430B2

(12) United States Patent
Abadi et al.

(10) Patent No.: US 8,621,430 B2
(45) Date of Patent: Dec. 31, 2013

(54) METHOD FOR CODE TRANSFORMATION SUPPORTING TEMPORAL ABSTRACTION OF PARAMETERS

(75) Inventors: Aharon Abadi, Eilat (IL); Jonathan Bnayahu, Haifa (IL); Ran Ettinger, Tel Aviv (IL); Yishai Abraham Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/039,342

(22) Filed: Mar. 3, 2011

(65) Prior Publication Data

US 2012/0227029 A1 Sep. 6, 2012

(51) Int. Cl.
*G06F 9/44* (2006.01)
(52) U.S. Cl.
USPC ........................................................ 717/110
(58) Field of Classification Search
USPC ........................................................ 717/110
See application file for complete search history.

(56) References Cited

U.S. PATENT DOCUMENTS

| 7,620,946 | B2 | 11/2009 | Russell |
| 7,624,385 | B2 | 11/2009 | Waddington et al. |
| 8,260,845 | B1 * | 9/2012 | Colton et al. ................ 709/203 |
| 2003/0046440 | A1 * | 3/2003 | Ricciardi ...................... 709/313 |
| 2004/0221293 | A1 * | 11/2004 | Srinivas et al. ............... 719/310 |
| 2008/0098208 | A1 | 4/2008 | Reid et al. |
| 2008/0196025 | A1 | 8/2008 | Meijer et al. |

OTHER PUBLICATIONS

Ettinger, "Refactoring via Program Sliding and Slicing" Wolfson College, Oxford University, PhD Thesis, 2006.*
W. F. Opdyke, "Refactoring Object-Oriented Frameworks", PhD thesis, University of Illinois at Urbana-Champaign, 1992.
W. G. Griswold and D. Notkin, "Automated assistance for program restructuring", IEEE Trans. Software Engineering, 2 (3):228-269, 1993.
A. Lakhotia and J.-C. Deprez, "Restructuring programs by tucking statements into functions", Information and Software Technology, 40(11-12):677-690, 1998.
R. Komondoor, "Automated Duplicated-Code Detection and Procedure Extraction", PhD thesis, University of Wisconsin—Madison 2003.
Aharon Abadi et al., "Fine slicing for advanced method extraction", IBM Haifa Research Lab, 2009.
Mark Weiser, "Program slicing", Computer Science Department University of Maryland, IEEE 1981.
Erica Mealy et al., "Improving usability of software refactoring tools", Proceedings of the 2007 Australian Software Engineering Conference (ASWEC'07) IEEE.

* cited by examiner

*Primary Examiner* — Li B Zhen
*Assistant Examiner* — Viva Miller

(57) ABSTRACT

A method of code transformation supporting temporal abstraction of parameters is provided herein. The method includes the following stages: extracting a set of statements from an original code and further creating a residual code being the original code without the statements, wherein two or more of the extracted statements are not on a same loop in the original code; adding conditions from the original code to the extracted set of statements, such that the added conditions are sufficient to render the set of statements executable; adding statements from the original code to the residual code, such that the added statements are sufficient to render the residual code executable; and adding code portions and variables to the set of statements and the residual code, such that a passing of values between the enhanced set of statements and the residual code maintains a respective passing of values in the original code.

21 Claims, 8 Drawing Sheets

```
IF (USEBORDERS()) {
  S1; //SOME CODE
  OUT.PRINTLN("<TABLE>");          ~310
}
ELSE{
  S2; //SOME CODE
  OUT.PRINTLN("<TABLE BORDER=0>"); ~320
}

INT START = PAGE * 20;
INT END = START + 20;
END = MATH.MIN(END, ALBUM.GETPICTURES().SIZE());
FOR (INT I = START; I < END; I++) {   ~330
  PICTURE PICTURE = ALBUM.GETPICTURE(I);
  PRINTPICTURE(OUT, PICTURE);         ~340
}
OUT.PRINTLN("</TABLE>");
```

```
PRINTSTREAM DISPLAY(PRINTSTREAM OUT,INT END,INT
START, QUEUE<PICTURE> PICTURES,BOOLEAN Q){
IF(Q) {
    OUT.PRINTLN("<TABLE>"); }
ELSE {
    OUT.PRINTLN("<TABLE BORDER=0>");   }        710
FOR (INT I = START; I < END; I++) {
    PRINTPICTURE(OUT,PICTURES.REMOVE());
}
OUT.PRINTLN("</TABLE>");
RETURN OUT;
}

BOOLEAN Q = USEBORDERS();
IF(Q) {
    S1; //SOME CODE
}
ELSE {
    S2; //SOME CODE
}
INT START = PAGE * 20;
INT END = START + 20;
END = MATH.MIN(END, ALBUM.GETPICTURES().SIZE());
QUEUE<PICTURE> PICTURES = NEW QUEUE<PICTURE>();
FOR (INT I = START; I < END; I++) {
    PICTURE PICTURE = ALBUM.GETPICTURE(I);
    PICTURES.ADD(PICTURE);
}
                                               720
```

Figure 7

```
BOOLEAN Q = USEBORDERS();
IF(Q) {
    S1; //SOME CODE
}
ELSE {
    S2; //SOME CODE
}
INT START = PAGE * 20;
INT END = START + 20;
END = MATH.MIN(END, ALBUM.GETPICTURES().SIZE());
QUEUE<PICTURE> PICTURES = NEW QUEUE<PICTURE>();
FOR (INT I = START; I < END; I++) {
    PICTURE PICTURE = ALBUM.GETPICTURE(I);
    PICTURES.ADD(PICTURE);
}
OUT = DISPLAY(OUT,END,START,PICTURES,Q);
```

METHOD FOR CODE TRANSFORMATION SUPPORTING TEMPORAL ABSTRACTION OF PARAMETERS

BACKGROUND

1. Technical Field

The present invention relates to computer code transformation and more particularly, to computer code transformation that supports extraction of statements that are not on the same loop.

2. Discussion Of The Related Art

As the amount of legacy computer code accumulates, hundreds of thousands of code lines are imposing a real challenge for programmers both in code readability and code reuse terms. In order to use portions of legacy code, it becomes crucial for programmers to be able to separate these portions of code lines (or statements) that are associated with a single operation so that the extracted statements may be either reused or replaced in their entirety by a newer version.

One known solution for separating code statements from an original code is called the Extract Method refactoring. This method can be useful by itself, or as a building block in larger refactoring tasks. Because it requires a deep analysis of data and control dependences, it is difficult to perform correctly without tools in complicated cases. Unfortunately, refactoring tools do not perform the required analysis, and will fail in or reject such cases. Some very useful cases, such as those involving non-contiguous code, cannot even be expressed using these tools' interfaces.

BRIEF SUMMARY

One aspect of the invention provides a method the includes the following stages: (i) extracting a set of statements from an original code, based on user selection, to yield an extracted set of statements and a residual code that includes the original code without the statements, wherein two or more of the extracted statements are not on a same loop in the original code; (ii) adding conditions from the original code to the extracted set of statements, to yield an enhanced set of statements, such that the added conditions are sufficient to render the enhanced set of statements executable while preserving semantics of the original code; (iii) adding statements from the original code to the residual code, to yield an enhanced residual code, such that the added statements are sufficient to render the residual code executable while preserving semantics of the original code; (iv) adding code portions and variables to the enhanced set of statements and the enhanced residual code, such that a passing of values between the enhanced set of statements and the residual code maintains a respective passing of values in the original code; an (v) determining a location in the enhanced residual code for an insertion of a call to the enhanced set of statements, wherein at least one of the aforementioned stages is carried out by at least one processor.

Other aspects of the invention may include a system arranged to execute the aforementioned method and a computer readable program configured to execute the stages of the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 3 is an exemplary code illustrating an aspect according to some embodiments of the invention;

FIG. 7 shows exemplary codes illustrating an aspect according to some embodiments of the invention; and FIG. 8 is an exemplary code illustrating an aspect according to some embodiments of the invention;

Figure 1:
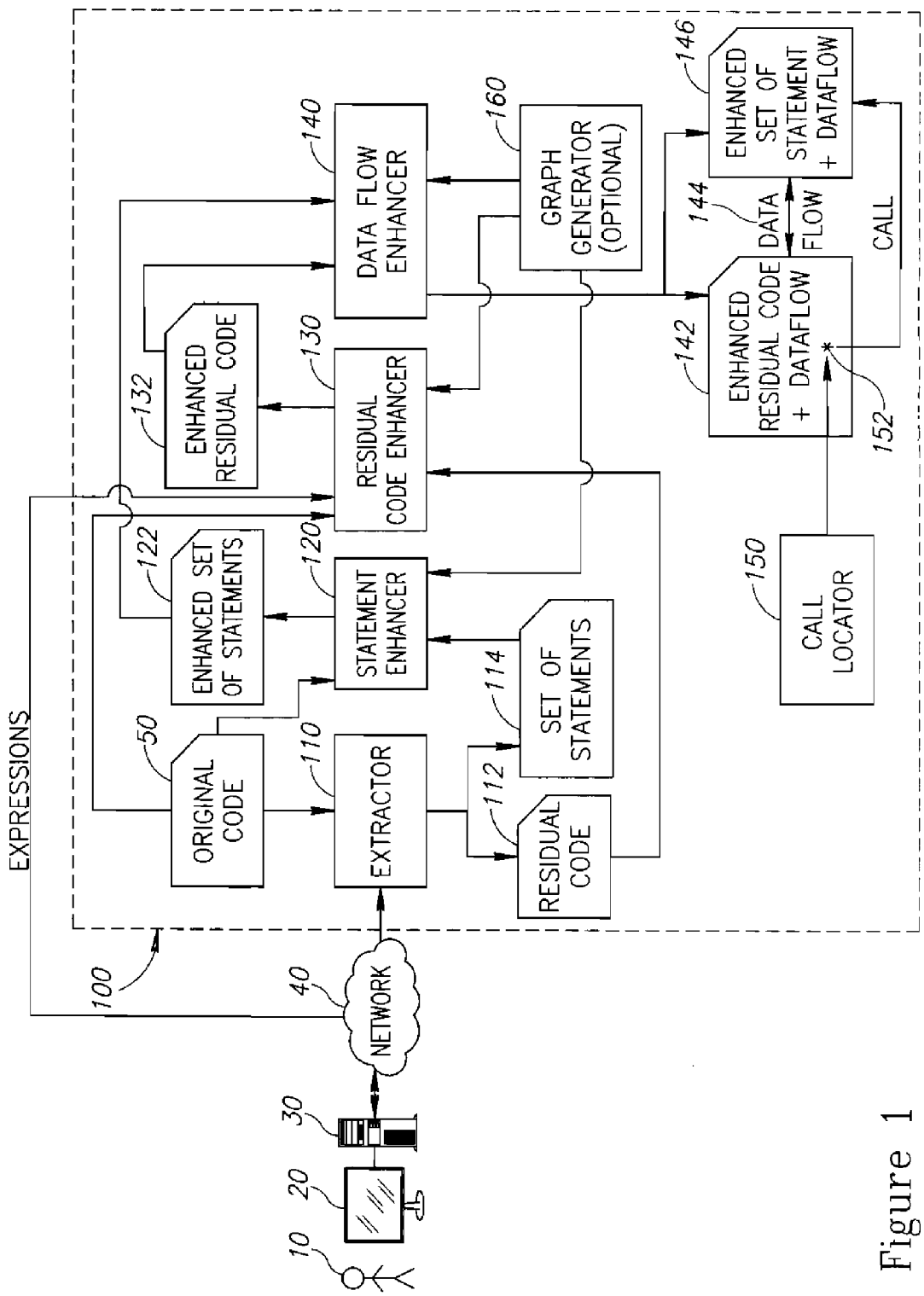
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "program slicing" or "code slicing" as used herein in this application refers to the computation of the set of programs statements, the program slice, that may affect the values at some point of interest, referred to as a slicing criterion. Program slicing can be used in debugging to locate source of errors more easily. Other applications of slicing include software maintenance, optimization, program analysis, and information flow control.

The term "code refactoring" as used herein in this application refers to restructuring code according to a specified policy undertaken in order to improve some of the nonfunctional attributes of the software. Typically, this is carried out by applying series of "refactorings", each of which is a change in a computer program's source code that does not modify its functional behavior. Advantages include improved code readability and reduced complexity to improve the maintainability of the source code, as well as a more expressive internal architecture or object model to improve extensibility.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a system according to some embodiments of the invention. System 100 may be in communication via a network 40 with at least one computer 30 associated with a user interface 20 and a user 10. User 10 is not necessarily a human user and system 100 may be a part of a larger automated system.

System 100 may include: an extractor 110 configured to extract a set of statements from an original code 50, based on user 10 selection made over user interface 20, to yield an extracted set of statements 114 and a residual code 112 that includes the original code without the statements, wherein two or more of the extracted statements are not on a same loop in the original code. System 100 may further include a statement enhancer 120 configured to add conditions from the original code 50 to the extracted set of statements 114, to yield an enhanced set of statements 122, such that the added conditions are sufficient to render the enhanced set of statements 122 executable while preserving semantics of the original code. System 100 may further include a residual code enhancer 130 configured to add statements from the original code 50 to the residual code 112, to yield an enhanced residual code 132, such that the added statements are sufficient to render the enhanced residual code 132 executable while preserving semantics of the original code. System 100 may further include a data flow enhancer 140 configured to add code portions and variables to the enhanced set of statements and the enhanced residual code, such that a passing of values 144 between the enhanced set of statements with the added data flow 146 and the residual code with the added data flow 142 maintains a respective passing of values in the original code. System 100 may further includes a call locator 150 configured to determine a location 152 in the enhanced residual code 142 for an insertion of a call to the enhanced set of statements 146. It is noted that any of the statement enhancer 120, the residual code enhancer 130, the data flow enhancer 140, and the call locator 150 are in operative association with at least one processor (not shown).

Consistent with some embodiments of the present invention, in order to make the set of statements 114 executable, it is necessary to add some conditions from original code 50. This is carried out by several sub steps as follows: (i) Add to set of statements 114 the lowest statement in original code 50 that dominates set of statements 114. The lowest statement is denoted herein as $S_{min}$; (ii) Add to set of statements 114 the highest location in original code 50 that postdominates set of statements 114. The highest location is denoted herein this location as $S_{max}$; (iii) Add to set of statements 114 all conditions from original code 50 that are on a path from some q in set of statements 114 to q' in set of statements 114 where q' is control-dependent on the conditions, except when $q=S_{max}$ and $q'=S_{min}$, wherein data on which any of the conditions depends on is not added; and (iv) Repeat sub steps (i)-(iii) taking into account the new statements added each time, until there is no change.

It is noted that in step (i) the lowest statement is the one that is dominated by all other statements in original code 50 that dominate all the statements in set of statements 114. Similarly, in step (ii) the highest statement is the one that is postdominated by all other statements in original code 50 that postdominate all statements in set of statements 114. In step (iv) this computation is iterated for unstructured programs (including unstructured constructs in so-called structured languages). Sub step (iii) excludes paths from $S_{max}$ to $S_{min}$, since these correspond to loops that contain the whole S, and should not be included in it. When S is extracted, the call will appear inside any such loops.

Consistent with some embodiments of the invention, at least some of the passing of values between the residual code and the extracted set of statements includes streaming a sequence of values as parameters. Consistent with some embodiments of the invention, the statements enhancer is configured to produce the enhanced set of statements by: (i) adding to the extracted set of statements, a lowest statement in the original code that dominates the set of statements; (ii) adding to the extracted set of statements a highest location in the original code that postdominates the set of statements; and (iii) adding to the extracted set of statements all the conditions from the original code that are on a control path from the highest location to the lowest statement, such that the lowest statement depends on the added conditions, wherein data that depends on the added conditions is not added.

Consistent with some embodiments of the invention, residual code enhancer is configured to produce the enhanced residual code by applying a backward slicing to the graph of the original code that stops at every variable use that gets its value from locations that designate values to be returned from the extracted set of statements, wherein the slicing is based on a slicing criteria that includes all the statements in the residual code.

Consistent with some embodiments of the invention, data flow enhancer is configured to select a specified location for adding a value to a sequence that will be passed as a parameter, as a location in the original code that is present in the extracted set of statements or the residual code but whose control predecessor is not present in the extracted set of statements or the residual code respectively, wherein that all control paths from a source of an uninitialized value to an uninitialized value pass through the specified location.

More specifically, as both enhanced set of statements 122 and enhanced residual code 132 contain uninitialized variables it is necessary for data flow enhancer 140 to determine the parameters and return value. Some of the parameters will remain scalar variables as in the original program. However, some of the variables need to get sequences of values as parameters. Data flow enhancer 140 will add the necessary code for passing the parameters and return values. Data flow enhancer 140 operates under the following observations in order to identify parameters that do not require sequences:

In an enhanced set of statements 122 and enhanced residual code 132, Let v be an uninitialized variable location in enhanced set of statements 122 (respectively enhanced residual code 132) whose source is in enhanced residual code 132 (respectively enhanced set of statements 122), and will be denoted as vs. Let SCC(v) be the strongly connected component in enhanced set of statements 122 (respectively, enhanced residual code 132) that contains v. Let SCC(v)' be the strongly connected component in original code 50 (respectively, enhanced residual code 132) that contains v. A sequence of values is needed for v if and only if SCC(v)' contains vs.

In order to compute the location for adding a value to a sequence that will be passed as a parameter, it is necessary to locate the unique place where the data passes into enhanced set of statements 122 (respectively enhanced residual code 132). This place is represented by a location 1 in original code 50 that is in enhanced set of statements 122 (respectively enhanced residual code 132) but whose control predecessor not in enhanced set of statements 122 (respectively enhanced residual code 132), such that all control paths from vs to v pass through that location.

Applicants have discovered that it is possible to prove that such an location always exists, and that it is the same for all uninitialized variable location of enhanced set of statements 122 (respectively enhanced residual code 132) that receive their values from vs. If an enqueue operation is inserted to original code 50 at location 1 immediately followed by a dequeue operation on the same queue, replacing the use of v with the use of the value returned by the dequeue operation, it is clear that the behavior of the original program is preserved. The queue will always be empty, except immediately between the two added operations.

When set of statements 122 is separated from enhanced residual code 132 the dequeue operation should be first added to enhanced set of statements 122 (respectively enhanced residual code 132). The enqueue operation will remain with enhanced residual code 132 (respectively enhanced set of statements 122) while the dequeue operation will be included with the extracted enhanced set of statements 122 (respectively enhanced residual code 132) This will change the behavior of the program so that all enqueue operations will be performed by enhanced residual code 132 (respectively enhanced set of statements 122) before passing the queue to enhanced set of statements 122 (respectively enhanced residual code 132), which will then dequeue the elements one by one until the queue is empty. It is possible to show that the original semantics of the program is preserved by this transformation.

Consistent with some embodiments of the invention, call locator is configured to determine the location such that it satisfies all of: (i) the location is contained in exactly a number of control cycles as a highest location in the original code that postdominates the set of statements; (ii) the location is dominated by all sources of parameters to the enhanced extracted set of statement; (iii) every path from the location to any of added enqueue operations passes through a lowest statement in the original code that dominates the set of statements; and (iv) the location dominates each statements containing uninitialized variables in the residual code.

Condition (i) ensures that the call will be executed the same number of times as the extracted code was in the original program. Conditions (ii) and (iii) ensure that all parameters will be ready before the call (since passing through $S_{min}$ initiates a new pass through the extracted code). It is noted that the control successor of $S_{max}$ satisfies the first three conditions, and the call can always be placed there (unless there are results to be returned from the extracted code to the enhanced residual code).

Consistent with some embodiments of the invention, system 100 further includes a graph generator 160 configured to generating graphs representative of at least one of: the original code, the extracted set of statements, the residual code, the enhanced set of statements, and the enhances residual code, wherein each graph includes all control paths and data paths separately. This may facilitate the implementation of the enhancers 120, 130, and 140. However, it is noted that the use of graphs is non-limiting and embodiments of the present invention may be carried out using different code representations.

Consistent with some embodiments of the invention, call locator is further configured to add the call to the enhanced extracted set of statements to the enhanced residual code, at the determined location.

Figure 2:
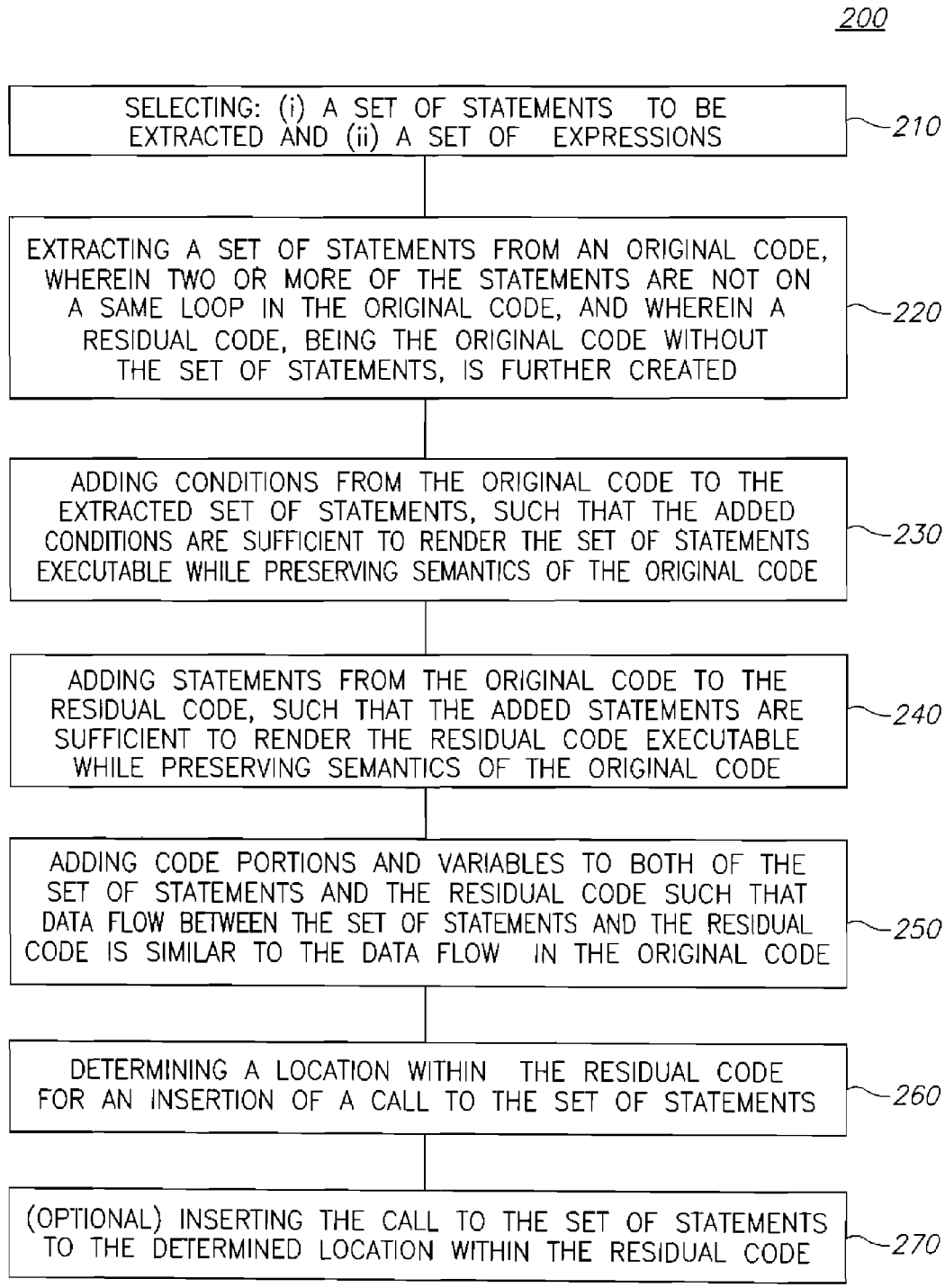
FIG. 2 is a high level flowchart illustrating a method according to some embodiments of the invention.

FIG. 2 is a high level flowchart illustrating a method according to some embodiments of the invention. Method 200 may include the following stages: selecting: (i) a set of statements to be extracted and (ii) expressions that need to be received rather than computed 210; extracting a set of statements from an original code, based on user selection, to yield an extracted set of statements and a residual code that includes the original code without the statements, wherein two or more of the extracted statements are not on a same loop in the original code 220; adding conditions from the original code to the extracted set of statements, to yield an enhanced set of statements, such that the added conditions are sufficient to render the enhanced set of statements executable while preserving semantics of the original code 230; adding statements from the original code to the residual code, to yield an enhanced residual code, such that the added statements are sufficient to render the residual code executable while preserving semantics of the original code 240; adding code portions and variables to the enhanced set of statements and the enhanced residual code, such that a passing of values between the enhanced set of statements and the residual code maintains a respective passing of values in the original code 250; and determining a location in the enhanced residual code for an insertion of a call to the enhanced set of statements 260. Optionally, the extracted set of statements may be aggregated and located together in a single specified location.

Optionally, method 200 may further include the stage of inserting a call to the enhanced extracted set of statements to the enhanced residual code, at the determined location 270.

The reminder of description illustrates a non-limiting implementation of embodiments of the present invention on an exemplary computer code. Consistent with some embodiments, the original code, the residual code, and the extracted statements are also represented as graphs. As explained above, other implementations that do not require the use of graphs may also be used in order to carry put embodiments of the present invention.

Figure 4:
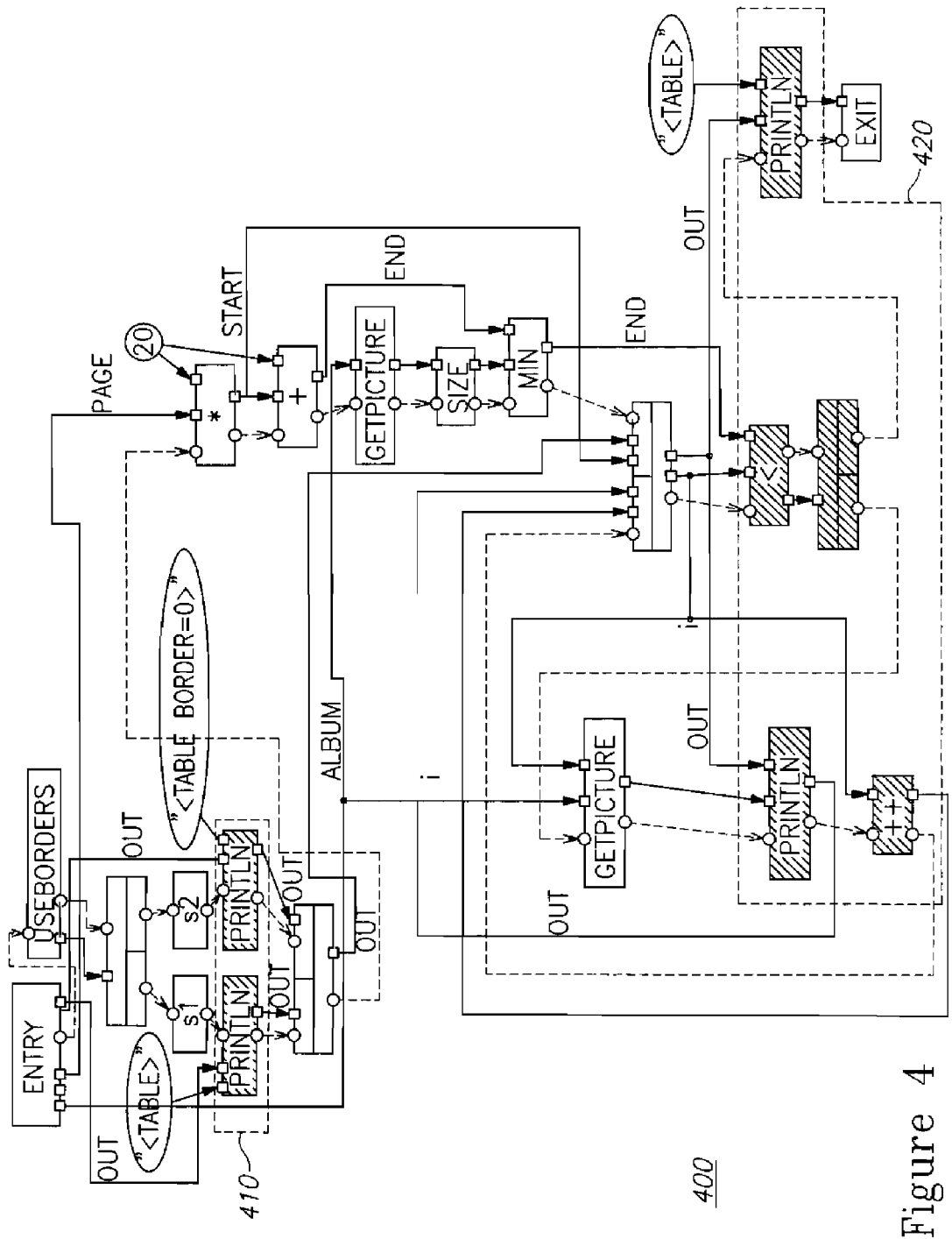
FIG. 4 is a graph diagram illustrating an aspect according to some embodiments of the invention.
Figure 5:
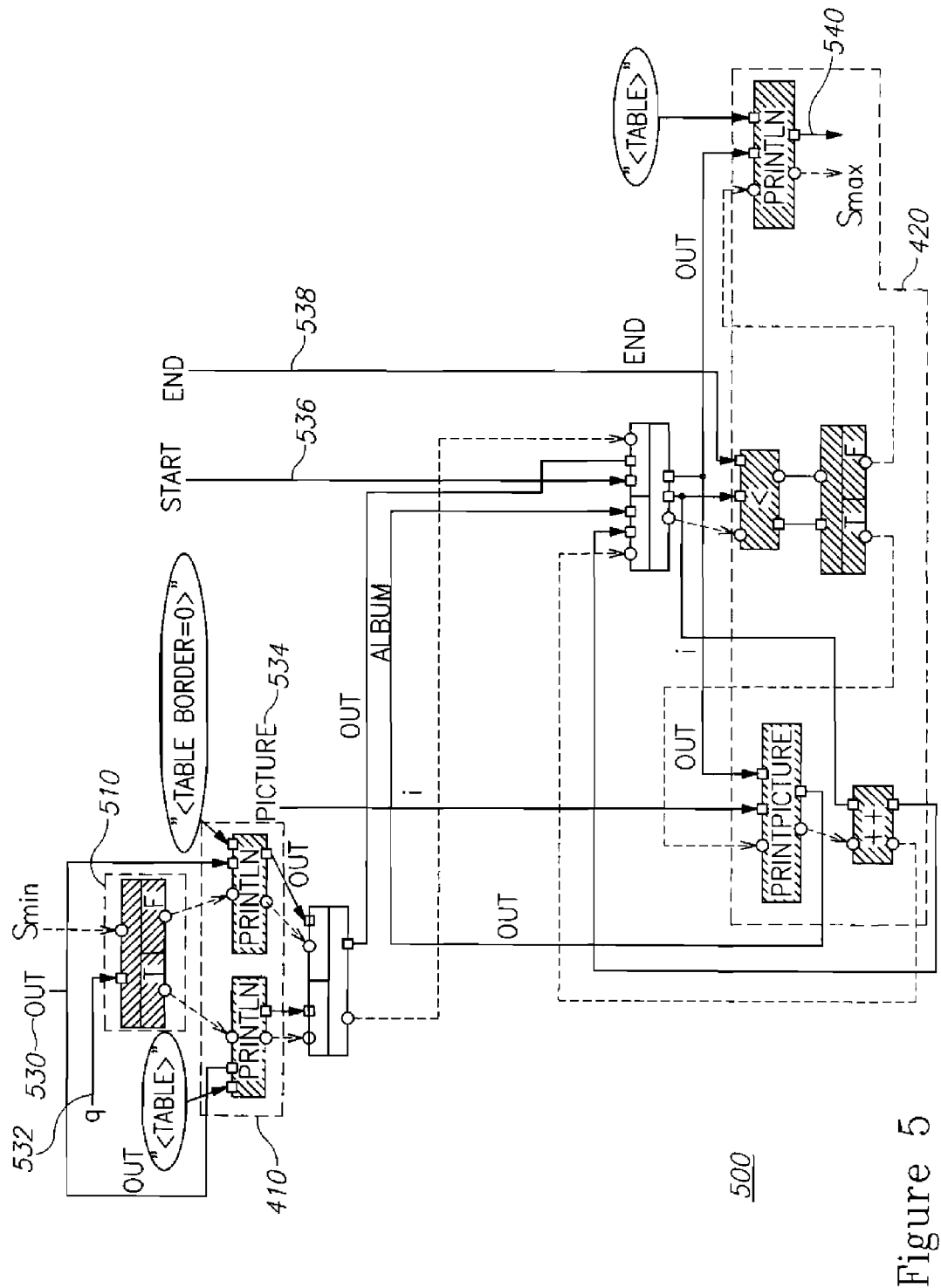
FIG. 5 is a graph diagram illustrating an aspect according to some embodiments of the invention.
Figure 6:
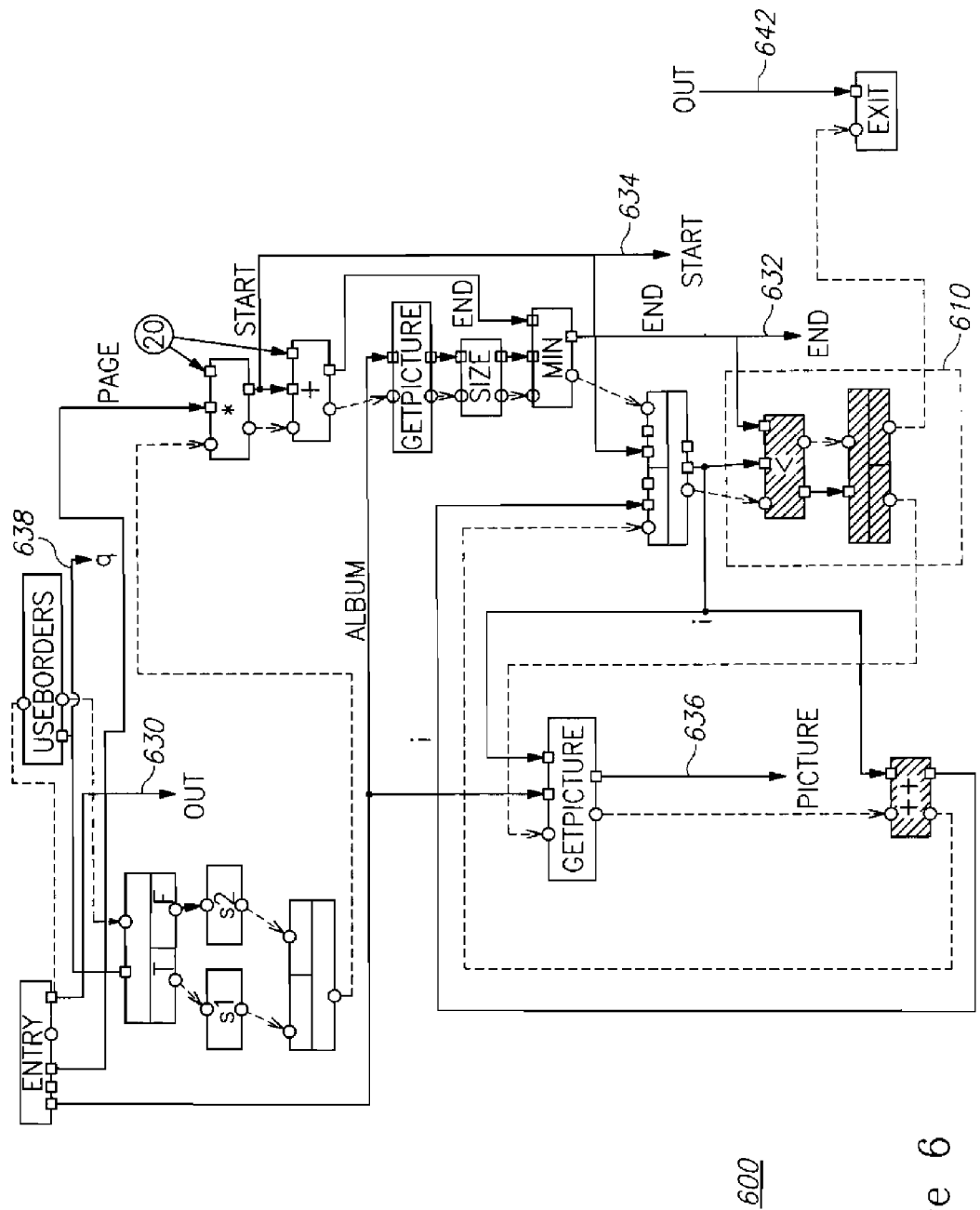
FIG. 6 is a graph diagram illustrating an aspect according to some embodiments of the invention.

FIG. 3 is exemplary original code 300 which serves as the input of embodiments of the present invention; FIG. 4 is a graph diagram 400 representing original code 300; FIG. 5 is a graph diagram 500 representing the extracted set of statements; FIG. 6 is a graph diagram 600 representing the residual code; FIG. 7 is exemplary codes illustrating an aspect according to some embodiments of the invention; and FIG. 8 is an exemplary code illustrating an aspect according to some embodiments of the invention.

Original code 300 is a code of a program that tangles the logic of fetching the pictures to be shown with their presentation in HTML format. In the following non-limiting example, a user wishes to separate the statements that relate to the display, 310-340 from original code 300. As clearly shown, statements 310-340 are not on the same loop and therefore the extracted set of statement in non-contiguous.

Graph 400 shows a graph representation of original code 300 in which graphic representation of statements to be extracted 410 and 420 correspond with statements 310-340 of code 300. Graph 500 shows graphic representation of extracted statements 410 and 420 showing $S_{min}$ and $S_{max}$ used as upper and lower limits for determining the conditions that need to be imported from original code 300 as explained above. Condition 510 is such a condition that has been added in order to render the set of statements executable while preserving the semantics of the original code. In addition, expressions 530, 532, 534, 536, and 538 receive the corresponding values from the residual code, whereas expression 540 is passed as a parameter to the residual code.

Graph 600 is representative of the semantics of the residual code. Statement 610 is a condition imported from original code 300 as explained above, to render the residual code executable while preserving the semantics of the original code. In addition, expression 642, receives the corresponding values from the set of statements, whereas expressions 630,

632, 634, 636, and 638 are passed as parameters to the set of statements. FIG. 7 show the enhanced set of statements (with the added conditions) 710 and the enhanced residual code (with the additional statement) 720. Lastly, FIG. 8 shows the final code 800 with a separated residual code and set of statements, and a call to the set of statements as a function call in the determined location in residual code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more non-transitory computer readable medium(s) may be utilized. The non-transitory computer readable medium may be a non-transitory computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a non-transitory computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", an "embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   extracting a set of statements from an original code, based on user selection, to yield an extracted set of statements and a residual code that includes portions of the original code, wherein two or more of the extracted statements are not on a same loop in the original code;
   adding conditions from the original code to the extracted set of statements, to yield an enhanced set of statements, such that the added conditions are sufficient to render the enhanced set of statements executable while preserving semantics of the original code;
   adding statements from the original code to the residual code, to yield an enhanced residual code, such that the added statements are sufficient to render the enhanced residual code executable while preserving semantics of the original code;
   adding code portions and a stream of variables to the enhanced set of statements and to the enhanced residual code, such that the data flow between the enhanced set of statements and the enhanced residual code is defined by the data flow in the original code coupled with streaming of data based on the stream of variables;
   generating a call to the set of statements from the enhanced residual code, the call for executing the enhanced set of statements; and determining a location in the enhanced residual code for an insertion of the call to the enhanced set of statements, wherein at least one of: the extracting, any of the adding, the generating, and the determining is carried out by at least one processor, wherein in the determining, the location is selected such that it satisfies all of: (i) the location is contained in exactly a number of control cycles as a highest location in the original code that postdominates the set of statements; (ii) the location is dominated by all sources of parameters to the enhanced extracted set of statement; (iii) every path from the location to any of added enqueue operations pass through a lowest statement in the original code that dominates the set of statements; and (iv) the location dominates each statements containing uninitialized variables in the residual code.

2. The method according to claim 1, wherein the enhanced set of statements is achieved by: (i) adding to the extracted set of statements, a lowest statement in the original code that dominates the set of statements; (ii) adding to the extracted set of statements a highest location in the original code that postdominates the set of statements; and (iii) adding to the extracted set of statements all the conditions from the original code that are on a control path from the highest location to the lowest statement, such that the lowest statement depends on the added conditions, wherein data that depends on the added conditions is not added.

3. The method according to claim 2, further comprising repeating the adding of the lowest statement, the adding of the highest location, and the adding of all the conditions, while taking into account the new statements added each time, until there is no further change after each one of the adding.

4. The method according to claim 1, wherein the enhanced residual code is achieved by applying a backward slicing to the original code that stops at every variable use that gets its value from locations that designate values to be returned from the extracted set of statements, wherein the slicing is based on a slicing criteria that includes all the statements in the residual code.

5. The method according to claim 1, wherein in the passing of values between the enhanced set of statements and the residual code, a specified location for adding a value to a sequence that will be passed as a parameter, is selected as a location in the original code that is present in the extracted set of statements or the residual code but whose control predecessor is not present in the extracted set of statements or the residual code respectively, wherein all control paths from a source of an uninitialized value to an uninitialized value pass through the specified location.

6. The method according to claim 1, further comprising generating graphs representative of at least one of: the original code, the extracted set of statements, the residual code, the enhanced set of statements, and the enhances residual code, wherein each graph includes all control paths and data paths separately.

7. The method according to claim 1, further comprising adding a the call to the enhanced extracted set of statements to the enhanced residual code, at the determined location.

8. A system comprising:
an extractor configured to extract a set of statements from an original code, based on user selection, to yield an extracted set of statements and a residual code that includes portions of the original code, wherein two or more of the extracted statements are not on a same loop in the original code;
a statement enhancer configured to add conditions from the original code to the extracted set of statements, to yield an enhanced set of statements, such that the added conditions are sufficient to render the enhanced set of statements executable while preserving semantics of the original code;
a residual code enhancer configured to add statements from the original code to the residual code, to yield an enhanced residual code, such that the added statements are sufficient to render the residual code executable while preserving semantics of the original code;
a data flow enhancer configured to add code portions and a stream of variables to the enhanced set of statements and the enhanced residual code, such that the data flow between the enhanced set of statements and the enhanced residual code is defined by the data flow in the original code coupled with streaming of data based on the stream of variables;
a call generator for generating a call to the set of statements from the enhanced residual code, the call for executing the enhanced set of statements; and a call locator configured to determine a location in the enhanced residual code for an insertion of the call to the enhanced set of statements, and, at least one processor programmed to operate the statements enhancer, the residual code enhancer, the data flow enhancer, the call generator, and the call locator, wherein the call locator is configured to determine the location such that it satisfies all of: (i) the location is contained in exactly a number of control cycles as a highest location in the original code that postdominates the set of statements; (ii) the location is dominated by all sources of parameters to the enhanced extracted set of statement; (iii) every path from the location to any of added enqueue operations pass through a lowest statement in the original code that dominates the set of statements; and (iv) the location dominates each statements containing uninitialized variables in the residual code.

9. The system according to claim 8, wherein the statements enhancer is configured to produce the enhanced set of statements by: (i) adding to the extracted set of statements, a lowest statement in the original code that dominates the set of statements; (ii) adding to the extracted set of statements a highest location in the original code that postdominates the set of statements; and (iii) adding to the extracted set of statements all the conditions from the original code that are on a control path from the highest location to the lowest statement, such that the lowest statement depends on the added conditions, wherein data that depends on the added conditions is not added.

10. The system according to claim 9, wherein the statement enhancer is further configured to repeat the adding of the lowest statement, the adding of the highest location, and the adding of all the conditions, while taking into account the new statements added each time, until there is no further change after each one of the adding.

11. The system according to claim 8, wherein the residual code enhancer is configured to produce the enhanced residual code by applying a backward slicing to the graph of the original code that stops at every variable use that gets its value from locations that designate values to be returned from the extracted set of statements, wherein the slicing is based on a slicing criteria that includes all the statements in the residual code.

12. The system according to claim 8, wherein the data flow enhancer is configured to select a specified location for adding a value to a sequence that will be passed as a parameter, as a location in the original code that is present in the extracted set of statements or the residual code but whose control predecessor is not present in the extracted set of statements or the residual code respectively, wherein that all control paths from a source of an uninitialized value to an uninitialized value pass through the specified location.

13. The system according to claim 8, further comprising a graph generator configured to generating graphs representative of at least one of: the original code, the extracted set of statements, the residual code, the enhanced set of statements, and the enhances residual code, wherein each graph includes all control paths and data paths separately.

14. The system according to claim 8, wherein the call locator is further configured to add the call to the enhanced extracted set of statements to the enhanced residual code, at the determined location.

15. A computer program product for code transformation supporting temporal abstraction of parameters, the computer program product comprising:
a non-transitory computer readable storage medium which is not a signal having computer readable program embodied therewith, the computer readable program comprising: computer readable program code configured to extract a set of statements from an original code, based on user selection, to yield an extracted set of statements and a residual code that includes portions of the original code,
wherein two or more of the extracted statements are not on a same loop in the original code;
computer readable program code configured to add conditions from the original code to the extracted set of statements, to yield an enhanced set of statements, such that the added conditions are sufficient to render the enhanced set of statements executable while preserving semantics of the original code;
computer readable program code configured to add statements from the original code to the residual code, to yield an enhanced residual code, such that the added statements are sufficient to render the residual code executable while preserving semantics of the original code;
computer readable program code configured to add code portions and a stream of variables to the enhanced set of statements and the enhanced residual code, such that the data flow between the enhanced set of statements and the enhanced residual code is defined by the data flow in the original code coupled with streaming of data based on the stream of variables;

computer readable program code for generating a call to the set of statements from the enhanced residual code, the call for executing the enhanced set of statements;

and computer readable program configured to determine a location in the enhanced residual code for an insertion of the call to the enhanced set of statements comprising computer readable program code configured to determine the location such that it satisfies all of: (i) the location is contained in exactly a number of control cycles as a highest location in the original code that postdominates the set of statements; (ii) the location is dominated by all sources of parameters to the enhanced extracted set of statement; (iii) every path from the location to any of added enqueue operations pass through a lowest statement in the original code that dominates the set of statements; and (iv) the location dominates each statements containing uninitialized variables in the residual code.

16. The computer program product according to claim 15, further comprising computer readable program code configured to produce the enhanced set of statements by: (i) adding to the extracted set of statements, a lowest statement in the original code that dominates the set of statements; (ii) adding to the extracted set of statements a highest location in the original code that postdominates the set of statements; and (iii) adding to the extracted set of statements all the conditions from the original code that are on a control path from the highest location to the lowest statement, such that the lowest statement depends on the added conditions, wherein data that depends on the added conditions is not added.

17. The computer program product according to claim 16, further comprising computer readable program code configured to repeat the adding of the lowest statement, the adding of the highest location, and the adding of all the conditions, while taking into account the new statements added each time, until there is no further change after each one of the adding.

18. The computer program product according to claim 15, further comprising computer readable program code configured to produce the enhanced residual code by applying a backward slicing to the graph of the original code that stops at every variable use that gets its value from locations that designate values to be returned from the extracted set of statements, wherein the slicing is based on a slicing criteria that includes all the statements in the residual code.

19. The computer program product according to claim 15, further comprising computer readable program code configured to select a specified location for adding a value to a sequence that will be passed as a parameter, as a location in the original code that is present in the extracted set of statements or the residual code but whose control predecessor is not present in the extracted set of statements or the residual code respectively, wherein that all control paths from a source of an uninitialized value to an uninitialized value pass through the specified location.

20. The computer program product according to claim 15, further comprising computer readable program code configured to generate graphs representative of at least one of: the original code, the extracted set of statements, the residual code, the enhanced set of statements, and the enhances residual code, wherein each graph includes all control paths and data paths separately.

21. The computer program product according to claim 15, further comprising computer readable program code configured to add the call to the enhanced extracted set of statements to the enhanced residual code, at the determined location.

* * * * *